United States Patent
Umemoto et al.

(10) Patent No.: US 10,033,169 B2
(45) Date of Patent: Jul. 24, 2018

(54) ELECTRIC DEVICE AND METHOD FOR MANUFACTURING ELECTRIC DEVICE

(71) Applicant: Mitsubishi Electric Corporation, Chiyoda-ku (JP)

(72) Inventors: Takahiro Umemoto, Chiyoda-ku (JP); Yasutomo Otake, Chiyoda-ku (JP); Manabu Yoshimura, Chiyoda-ku (JP); Katsushi Nakada, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 15/550,085

(22) PCT Filed: Mar. 28, 2016

(86) PCT No.: PCT/JP2016/059817
§ 371 (c)(1),
(2) Date: Aug. 10, 2017

(87) PCT Pub. No.: WO2016/189956
PCT Pub. Date: Dec. 1, 2016

(65) Prior Publication Data
US 2018/0034251 A1 Feb. 1, 2018

(30) Foreign Application Priority Data

May 26, 2015 (JP) .................. 2015-105940

(51) Int. Cl.
*H01R 13/28* (2006.01)
*H02G 1/14* (2006.01)

(52) U.S. Cl.
CPC ...................... *H02G 1/14* (2013.01)

(58) Field of Classification Search
CPC ........ H01R 13/22; H01R 13/28; H01R 13/24; H01R 2103/00; B61G 5/10; H02G 1/14
(Continued)

(56) References Cited

U.S. PATENT DOCUMENTS 2,178,931 A * 11/1939 Crites .................. E21B 17/028
174/47
2,312,652 A * 3/1943 Komives ................. H02G 1/14
156/48
(Continued)

FOREIGN PATENT DOCUMENTS

| JP | 2003-016881 A | 1/2003 |
| JP | 2010-142089 A | 6/2010 |
| JP | 2014-087172 A | 5/2014 |

OTHER PUBLICATIONS

International Search Report dated Jun. 14, 2016 in PCT/JP2016/059817, filed Mar. 28, 2016.

*Primary Examiner* — Abdullah Riyami
*Assistant Examiner* — Vladimir Imas
(74) *Attorney, Agent, or Firm* — Oblon, McClelland, Maier & Neustadt, L.L.P.

(57) ABSTRACT

A first opposing surface inclination angle of a protruding first solid insulating material of a first high-voltage device is smaller than a second opposing surface inclination angle of a dented second solid insulating material of a second high-voltage device. A hollow truncated-cone flexible insulating material of which the thickness before insertion between the first high-voltage device and the second high-voltage device is the same at every part and the elasticity modulus gradually increases from a small-diameter side toward a large-diameter side, or a hollow truncated-cone flexible insulating material of which the thickness before insertion gradually increases from a small-diameter side toward a large-diameter side and the elasticity modulus is the same at every part, is compressed and sandwiched between the first solid insulating material and the second solid insulating material.

3 Claims, 6 Drawing Sheets

(58) Field of Classification Search
USPC .................. 439/289, 819, 578, 592, 675
See application file for complete search history.

(56) References Cited

U.S. PATENT DOCUMENTS

| | | | | |
|---|---|---|---|---|
| 2,337,800 A * | 12/1943 | Cassen | ............... | H01R 13/53 174/31 R |
| 2,894,054 A * | 7/1959 | Cameron | ............... | H01H 33/24 174/140 R |
| 3,178,505 A * | 4/1965 | Van Sickle | ............... | H01B 17/26 174/12 BH |
| 3,234,322 A * | 2/1966 | Frowein | ............... | H01B 17/28 174/143 |
| 3,274,688 A * | 9/1966 | O'Mara | ............... | H02G 1/14 33/474 |
| 3,293,354 A * | 12/1966 | Clason | ............... | H01H 9/085 174/127 |
| 3,611,132 A * | 10/1971 | Wright | ............... | G01R 19/145 174/11 BH |
| 3,622,688 A * | 11/1971 | Link | ............... | H01B 17/28 174/142 |
| 3,701,080 A * | 10/1972 | Baisz | ............... | H01R 9/0503 174/75 C |
| 3,737,836 A * | 6/1973 | Henry | ............... | H01H 1/38 439/248 |
| 3,951,712 A * | 4/1976 | Nakata | ............... | H02G 1/14 156/312 |
| 3,976,352 A * | 8/1976 | Spinner | ............... | H01R 24/40 333/260 |
| 4,044,208 A * | 8/1977 | McDonald | ............... | H01R 13/707 200/51.09 |
| 4,084,307 A * | 4/1978 | Schultz | ............... | H02G 1/14 156/49 |
| 4,207,446 A * | 6/1980 | Sasaki | ............... | H01H 33/16 218/79 |
| 4,241,973 A * | 12/1980 | Mayer | ............... | H01R 24/40 174/73.1 |
| 4,300,028 A * | 11/1981 | Cronin | ............... | H02B 13/035 200/11 B |
| 4,431,859 A * | 2/1984 | Kishida | ............... | H02G 15/22 174/142 |
| 4,810,899 A * | 3/1989 | Vincent | ............... | H01F 38/42 174/73.1 |
| 5,387,448 A * | 2/1995 | Watanabe | ............... | H01B 17/36 174/11 BH |
| 5,492,740 A * | 2/1996 | Vallauri | ............... | B29C 61/065 174/73.1 |
| 6,485,331 B1 * | 11/2002 | Lample | ............... | H01R 13/533 439/279 |
| 6,545,241 B1 * | 4/2003 | Franchi | ............... | H02B 13/035 218/154 |
| 6,573,469 B1 * | 6/2003 | Piazza | ............... | H02B 13/035 218/12 |
| 6,782,618 B2 * | 8/2004 | Luzzi | ............... | H02G 1/14 29/748 |
| 6,784,392 B1 * | 8/2004 | Piazza | ............... | H02B 13/035 218/14 |
| 6,866,306 B2 * | 3/2005 | Boyle | ............... | E21B 17/028 166/66.5 |
| 7,034,757 B2 * | 4/2006 | Martek | ............... | H01Q 1/36 343/715 |
| 7,250,583 B2 * | 7/2007 | Cameroni | ............... | H01H 33/122 218/14 |
| 7,425,152 B2 * | 9/2008 | Hardt | ............... | H01R 13/53 439/578 |
| 7,511,243 B2 * | 3/2009 | Laskowski | ............... | H02B 13/035 218/14 |
| 7,579,570 B2 * | 8/2009 | Bauch | ............... | H02B 5/06 218/45 |
| 7,645,408 B2 * | 1/2010 | Vallauri | ............... | H02G 1/14 156/47 |
| 8,119,193 B2 * | 2/2012 | Vallauri | ............... | H02G 15/1826 29/235 |
| 8,273,200 B2 * | 9/2012 | Portas | ............... | H02G 1/14 156/294 |
| 8,555,499 B2 * | 10/2013 | Portas | ............... | H02G 1/14 29/868 |
| 8,568,166 B2 * | 10/2013 | Ryu | ............... | H01R 4/30 439/578 |
| 8,723,070 B2 * | 5/2014 | Yoshida | ............... | H02B 13/0354 218/118 |
| 8,748,770 B2 * | 6/2014 | Nakayama | ............... | H02B 13/0356 218/154 |
| 8,872,043 B2 * | 10/2014 | Roseen | ............... | H02G 15/22 174/650 |
| 8,963,037 B2 * | 2/2015 | Nakada | ............... | H01H 33/42 218/120 |
| 9,048,638 B2 * | 6/2015 | Madden | ............... | H02G 15/113 |
| 9,190,815 B2 * | 11/2015 | Seraj | ............... | H02G 1/14 |
| 9,325,084 B2 * | 4/2016 | Mitjans | ............... | E21B 17/028 |
| 9,396,888 B1 * | 7/2016 | Yeckley | ............... | H01H 9/52 |
| 9,425,605 B2 * | 8/2016 | Yaworski | ............... | H02G 15/08 |
| 9,490,051 B2 * | 11/2016 | Inao | ............... | H02G 3/0481 |
| 9,590,287 B2 * | 3/2017 | Burris | ............... | H01P 1/266 |
| 9,613,735 B2 * | 4/2017 | Portas | ............... | H01B 13/22 |
| 2009/0252190 A1 * | 10/2009 | Yoshimura | ............... | H01S 5/227 372/45.01 |
| 2010/0134957 A1 * | 6/2010 | Tsurimoto | ............... | H02B 13/0356 361/612 |
| 2010/0265635 A1 * | 10/2010 | Yoshimura | ............... | H02B 13/0356 361/612 |
| 2013/0270228 A1 * | 10/2013 | Nakada | ............... | H01H 33/12 218/158 |
| 2015/0262773 A1 * | 9/2015 | Yoshimura | ............... | H02G 5/06 200/48 R |

\* cited by examiner

ELECTRIC DEVICE AND METHOD FOR MANUFACTURING ELECTRIC DEVICE

TECHNICAL FIELD

The present invention relates to an electric device such as a switchgear that configures a system by mutually connecting high-voltage devices such as a high-voltage conductor, a circuit breaker, and a disconnector which are molded by a solid insulating material, and to a method for manufacturing such an electric device.

BACKGROUND ART

In general, an electric device is known, and this electric device configures a system by mutually connecting high-voltage devices such as a high-voltage conductor, a circuit breaker, a disconnector, and a vacuum valve which are molded by a solid insulating material represented by epoxy resin.

In the mutually connected high-voltage devices, the high-voltage device on one side has a connection surface having a convex shape protruding in a conical shape, and has a conductor at the center, and the outer periphery of the conductor is molded by a solid insulating material. The high-voltage device on the other side has a connection surface having a concave shape dented in a conical shape, and also has a conductor at the center, and the outer periphery of the conductor is molded by a solid insulating material.

When current is applied, high voltage is applied to the conductor provided at the center of each high-voltage device. The outer peripheral surface of the solid insulating material forming the mold is often processed so as to be coated with a conductive paint and is electrically grounded.

That is, in the electric device configuring the system, an insulation property is important at the contact interfaces of the solid insulating material (referred to as a one-side solid insulating material) of the high-voltage device on one side and the solid insulating material (referred to as an other-side solid insulating material) of the high-voltage device on the other side. Accordingly, a flexible insulating material such as silicone rubber is interposed between the contact interfaces, to improve the adhesiveness of the solid insulating materials, thus a void and a gap at the interface can be eliminated and the insulation property can be improved.

However, in the case where the solid insulating materials are merely connected with a flexible insulating material interposed therebetween, the surface pressure becomes uneven in the thickness direction, the internal diameter direction, and the external diameter direction in the flexible insulating material, and partial discharge occurs at a part in which the surface pressure is low, thus a problem exists in that the insulation property is deteriorated.

In order to solve such a problem, one of electric devices is configured such that a step portion is provided in the contact surface of the other-side solid insulating material that contacts with the one-side solid insulating material, and the solid insulating materials are connected to each other while a flexible insulating material having a greater thickness than the depth of the step portion is interposed therebetween, thereby the surface pressure of the flexible insulating material can become constant. In this electric device, silicon grease is applied to the step portion (see, for example, Patent Document 1).

In another electric device, the center-side thickness of a soft insulating material corresponding to the flexible insulating material is set to be greater than the thickness on the external diameter side, and in the interface between each solid insulating material and the soft insulating material, the surface pressure on the center side in which the electric field intensity is high becomes greater when the high-voltage device on one side and the high-voltage device on the other side are connected, thus withstand voltage performance can be improved (see, for example, Patent Document 2).

CITATION LIST

Patent Document

Patent Document 1: Japanese Laid-Open Patent Publication No. 2010-142089 (pages 3-4, FIG. 1)
Patent Document 2: Japanese Laid-Open Patent Publication No. 2003-16881 (page 4, FIG. 3)

SUMMARY OF THE INVENTION

Problems to be Solved by the Invention

A electric device disclosed in Patent Document 1 has a structure in which the surface pressure of flexible insulating material becomes constant at every part after the high-voltage device on one side and the high-voltage device on the other side are connected. In this case, in the work of connecting the high-voltage device on one side and the high-voltage device on the other side, the flexible insulating material is, from the internal diameter side to the external diameter side thereof, brought into contact with the solid insulating material at the same time. Therefore, bubbles cannot be removed from the connection interface and thus the bubbles are left.

At a stage immediately after the high-voltage device on one side and the high-voltage device on the other side are connected, the surface pressure is applied even if bubbles are left at the interface. Thus, the inner pressure in the left bubbles increases and deterioration in the partial discharge property can be reduced.

However, the electric device disclosed in Patent Document 1 is operated over several tens of years, and therefore the flexible insulating material is deteriorated over time and the interface surface pressure is reduced. As a result, the inner pressure of the bubbles left at the interface in advance is also reduced, thus a problem exists in that the partial discharge property is significantly deteriorated.

The electric device disclosed in Patent Document 2 has a structure in which the surface pressure of the soft insulating material after the high-voltage device on one side and the high-voltage device on the other side are connected is distributed so as to be higher on the center side than on the external diameter side, thus insulation performance on the center side in which the electric field is high can be ensured.

However, the electric device disclosed in Patent Document 2 is also operated over several tens of years, and therefore the soft insulating material is deteriorated over time, and the interface surface pressure is reduced. As a result, air enters the external diameter side in which the surface pressure is set to be relatively low in advance, whereby bubbles occur at the interface.

That is, at the external-diameter-side interface of the soft insulating material with the solid insulating material, a large-size gap is formed, thus a problem exists in that insulation performance is reduced even on the external diameter side in which the electric field is relatively low.

The present invention has been made to solve the above problems, and an object of the present invention is to provide an electric device in which high-voltage devices molded by solid insulating materials are connected to each other with a flexible insulating material interposed between the solid insulating materials, and in which bubbles can be prevented from occurring at the interface between each solid insulating material and the flexible insulating material, and the surface pressure at the interface between each solid insulating material and the flexible insulating material is uniformed while distribution and bias are restrained, thereby reduction in insulation performance can be prevented even if the interface surface pressure is reduced due to long-term deterioration.

Means of Solution to the Problems

In a first electric device according to the present invention, a first solid insulating material insulating a conductor of a first high-voltage device has a shape having a side wall surface of a truncated cone such that a first opposing surface thereof which is a surface opposed to a second solid insulating material insulating a conductor of a second high-voltage device protrudes in an axial direction, the second solid insulating material has a shape having a side wall surface of a truncated cone such that a second opposing surface thereof which is a surface opposed to the first solid insulating material is dented in the axial direction, a first opposing surface inclination angle which is an angle of the first opposing surface is smaller than a second opposing surface inclination angle which is an angle of the second opposing surface, and a flexible insulating material interposed between the first opposing surface and the second opposing surface has a hollow truncated-cone shape such that an inner diameter and an outer diameter thereof at an end on one side are respectively greater than those at an end on another side.

In the case where the thickness of the flexible insulating material that has not yet been inserted between the first high-voltage device and the second high-voltage device is the same at every part, an elasticity modulus of the flexible insulating material gradually increases from a small-diameter side toward a large-diameter side.

In the case where the thickness of the flexible insulating material that has not yet been inserted between the first high-voltage device and the second high-voltage device gradually increases from a small-diameter side to a large-diameter side, an elasticity modulus of the flexible insulating material is the same at every part.

The flexible insulating material has an inner circumferential side surface in contact with the first opposing surface and has an outer circumferential side surface in contact with the second opposing surface.

In a second electric device according to the present invention, a first solid insulating material insulating a conductor of a first high-voltage device has a shape having a side wall surface of a truncated cone such that a first opposing surface thereof which is a surface opposed to a second solid insulating material insulating a conductor of a second high-voltage device protrudes in an axial direction, and the second solid insulating material has a shape having a side wall surface of a truncated cone such that a second opposing surface thereof which is a surface opposed to the first solid insulating material is dented in the axial direction.

In the case where a first opposing surface inclination angle which is an angle of the first opposing surface is the same as a second opposing surface inclination angle which is an angle of the second opposing surface, the thickness of the flexible insulating material that has not yet been inserted between the first high-voltage device and the second high-voltage device gradually increases from a large-diameter side toward a small-diameter side, and an elasticity modulus of the flexible insulating material gradually decreases from a large-diameter side toward a small-diameter side.

In the case where the first opposing surface inclination angle is greater than the second opposing surface inclination angle, the thickness of the flexible insulating material that has not yet been inserted between the first high-voltage device and the second high-voltage device gradually increases from a large-diameter side toward a small-diameter side, and an elasticity modulus of the flexible insulating material is the same at every part.

The flexible insulating material has an inner circumferential side surface in contact with the first opposing surface and has an outer circumferential side surface in contact with the second opposing surface.

In a method for manufacturing an electric device according to the present invention, a first solid insulating material has a shape having a side wall surface of a truncated cone such that a first opposing surface thereof which is a surface opposed to a second solid insulating material protrudes in an axial direction, the second solid insulating material has a shape having a side wall surface of a truncated cone such that a second opposing surface thereof which is a surface opposed to the first solid insulating material is dented in the axial direction, a first opposing surface inclination angle which is an interior angle formed by the first opposing surface and a virtual line that is parallel with the axial direction and extends toward a counter-protrusion side from the first opposing surface, is smaller than a second opposing surface inclination angle which is an interior angle formed by the second opposing surface and a virtual line that is parallel with the axial direction and extends toward a counter-dented side from the second opposing surface, a flexible insulating material has a hollow truncated-cone shape in which an inner diameter and an outer diameter thereof at an end on one side are respectively greater than those at an end on another side, the flexible insulating material is designed such that the thickness thereof is the same at every part and an elasticity modulus thereof gradually increases from a small-diameter side toward a large-diameter side, or such that the thickness thereof gradually increases from a small-diameter side toward a large-diameter side and an elasticity modulus thereof is the same at every part, and a first high-voltage device and a second high-voltage device are connected to each other such that an inner circumferential side surface of the flexible insulating material is in contact with the first opposing surface and an outer circumferential side surface of the flexible insulating material is in contact with the second opposing surface.

Effect of the Invention

In electric devices and method for manufacturing the electric devices according to the present invention, a first opposing surface inclination angle of a first solid insulating material is smaller than a second opposing surface inclination angle of a second solid insulating material, a used flexible insulating material has a hollow truncated-cone shape, and the thickness thereof before insertion between the first high-voltage device and the second high-voltage device is the same at every part and the elasticity modulus thereof gradually increases from the small-diameter side toward the large-diameter side. Alternatively, the first opposing surface inclination angle of the first solid insulating material is equal to the second opposing surface inclination angle of the second solid insulating material, the used flexible insulating material has a hollow truncated-cone shape, and the thickness thereof before insertion between the first high-voltage device and the second high-voltage device gradually increases from the large-diameter side toward the small-diameter side and the elasticity modulus thereof gradually decreases. Alternatively, the first opposing surface inclination angle of the first solid insulating material is smaller than the second opposing surface inclination angle of the second solid insulating material, the used flexible insulating material has a hollow truncated-cone shape, and the thickness thereof before insertion between the first high-voltage device and the second high-voltage device gradually increases from the small-diameter side toward the large-diameter side and the elasticity modulus thereof is the same at every part. Alternatively, the first opposing surface inclination angle of the first solid insulating material is greater than the second opposing surface inclination angle of the second solid insulating material, the used flexible insulating material has a hollow truncated-cone shape, and the thickness thereof before insertion between the first high-voltage device and the second high-voltage device gradually increases from the large-diameter side toward the small-diameter side and the elasticity modulus thereof is the same at every part.

Therefore, bubbles can be prevented from occurring at the interface between each solid insulating material and the flexible insulating material, and the interface surface pressure between each solid insulating material and the flexible insulating material is uniformed, whereby reduction in insulation performance can be prevented even if the interface surface pressure is reduced due to long-term deterioration.

EMBODIMENTS FOR CARRYING OUT THE INVENTION

Figure 1:
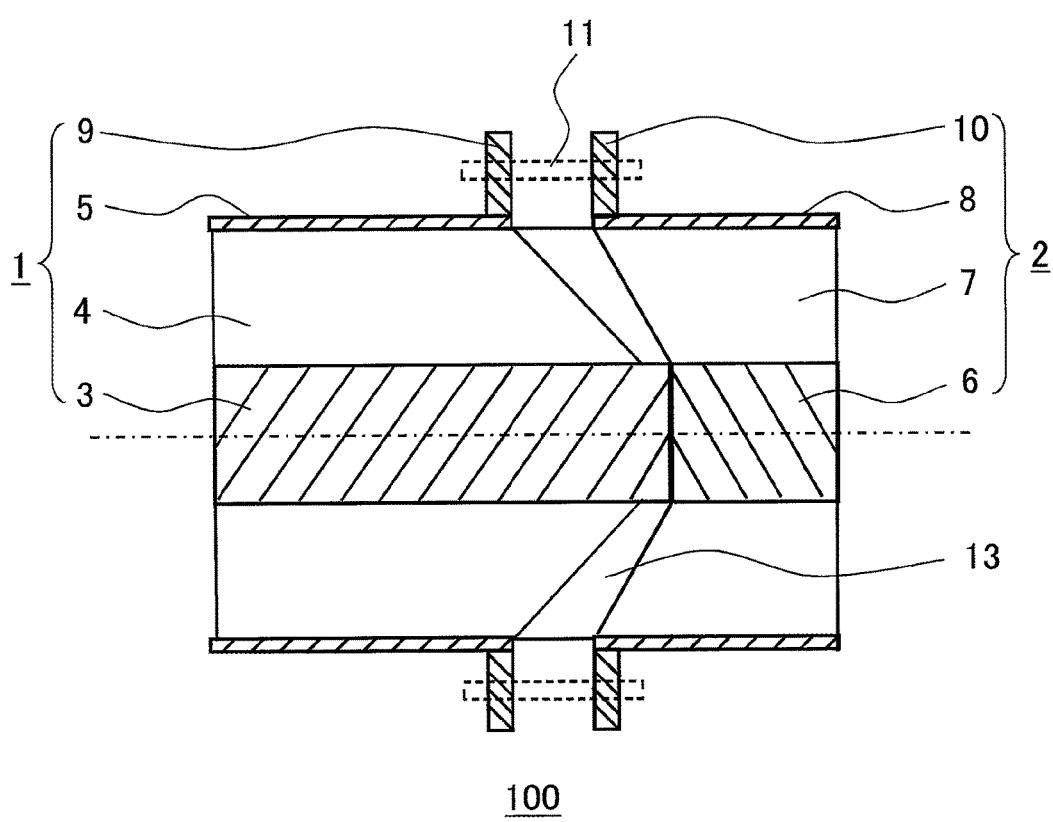
FIG. 1 is a schematic side sectional view showing an electric device according to embodiment 1 of the present invention.

Hereinafter, an electric device and a method for manufacturing the electric device according to the present invention will be described with reference to drawings. In the description of the embodiments below, the same or corresponding components in the drawings are denoted by the same reference characters, and the description thereof is not repeated.

Embodiment 1

FIG. 1 is a schematic side sectional view showing an electric device according to embodiment 1 of the present invention.

Figure 2:
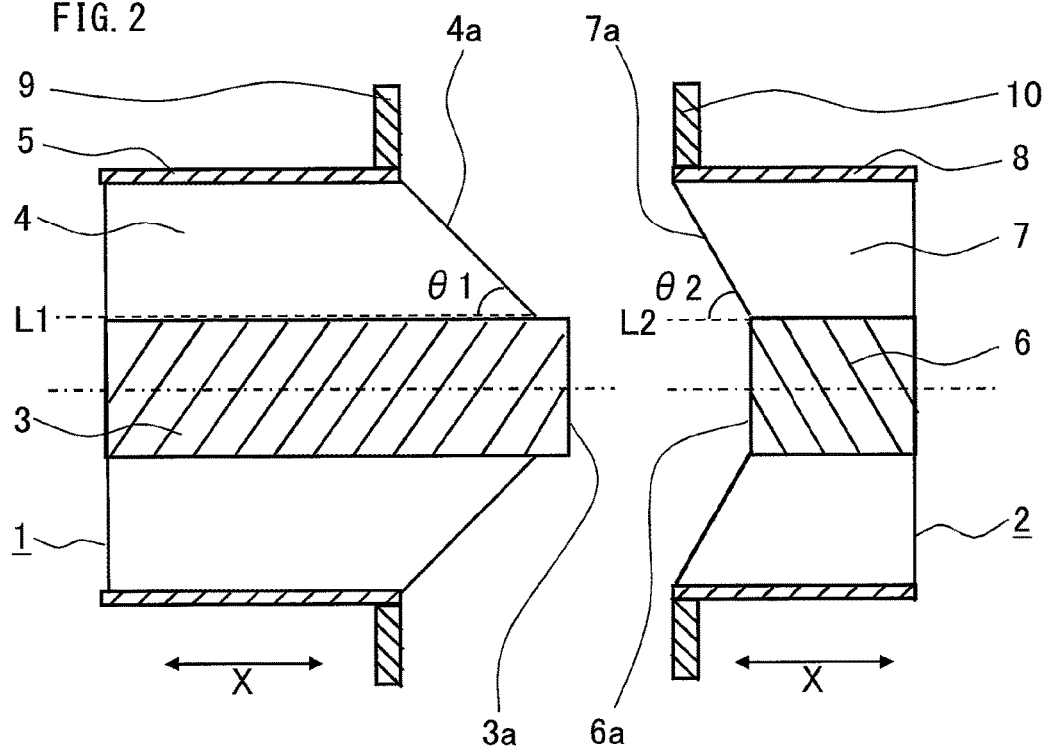
FIG. 2 is a schematic side sectional view of high-voltage devices used in the electric device according to embodiment 1 of the present invention.

FIG. 2 is a schematic side sectional view of high-voltage devices used in the electric device according to embodiment 1 of the present invention.

FIG. 2 shows a first high-voltage device 1 and a second high-voltage device 2 composing the electric device 100 of the present embodiment before they are connected.

As shown in FIG. 1, in the electric device 100 of the present embodiment, the first high-voltage device 1 and the second high-voltage device 2 are connected to each other with a flexible insulating material 13 provided therebetween.

As shown in FIG. 1 and FIG. 2, the first high-voltage device 1 is composed of: a first conductor 3 which is provided at the center and to which high voltage is applied; a first solid insulating material 4 which is formed around the outer circumference of the first conductor 3 by molding and insulates the first conductor 3; and a first external ground layer 5 provided on the outer circumferential surface of the first solid insulating material 4.

The first high-voltage device 1 has a surface opposed to the second high-voltage device 2 and protruding so as to become a convex shape in the axial direction shown by two-way arrow X. The first high-voltage device 1 is provided with a first bolt fastening portion 9 at an end on a side opposed to the second high-voltage device 2, on the outer circumference.

The second high-voltage device 2 is composed of: a second conductor 6 which is provided at the center and to which high voltage is applied; a second solid insulating material 7 which is formed around the outer circumference of the second conductor 6 by molding and insulates the second conductor 6; and a second external ground layer 8 provided on the outer circumferential surface of the second solid insulating material 7.

The second high-voltage device 2 has a surface opposed to the first high-voltage device 1 and dented so as to become a concave shape in the axial direction shown by two-way arrow X. The second high-voltage device 2 is provided with a second bolt fastening portion 10 at an end on a side opposed to the first high-voltage device 1, on the outer circumference.

The outer diameter of the first solid insulating material 4 is equal to the outer diameter of the second solid insulating material 7.

As the first solid insulating material 4 and the second solid insulating material 7, moldable insulating materials represented by epoxy resin are used.

As the first external ground layer 5 and the second external ground layer 8, for example, a paint obtained by mixing carbon black into resin is used, and these layers are formed by applying the paint to the outer circumference of each solid insulating material 4, 7 and then drying the paint.

As shown in FIG. 1 and FIG. 2, a surface (referred to as a first conductor contact surface) 3a of the first conductor 3 that contacts with the second conductor 6, and a surface (referred to as a second conductor contact surface) 6a of the second conductor 6 that contacts with the first conductor 3, are both perpendicular to the axial direction. The first conductor 3 protrudes from a first opposing surface 4a of the first solid insulating material 4 as described later.

The outer diameter of the first conductor 3 is equal to the outer diameter of the second conductor 6.

As shown in FIG. 1, when the first high-voltage device 1 and the second high-voltage device 2 are connected to form the electric device, the first conductor contact surface 3a and the second conductor contact surface 6a are brought into contact with each other, whereby the first conductor 3 and the second conductor 6 become electrically conductive to each other.

As shown in FIG. 2, a surface (referred to as a first opposing surface) 4a of the protruding first solid insulating material 4 that is opposed to the second solid insulating material 7 has a shape having a side wall surface of a truncated cone.

A surface (referred to as a second opposing surface) 7a of the dented second solid insulating material 7 that is opposed to the first solid insulating material 4 also has a shape having a side wall surface of a truncated cone.

An interior angle (referred to as a first opposing surface inclination angle) $\theta 1$ formed by the first opposing surface 4a and a virtual line L1 which is parallel with the axial direction of the first high-voltage device 1 and extends toward the counter-protrusion side from the first opposing surface 4a, is smaller than an interior angle (referred to as a second opposing surface inclination angle) $\theta 2$ formed by the second opposing surface 7a and a virtual line L2 which is parallel with the axial direction of the second high-voltage device 2 and extends toward the counter-dented side from the second opposing surface 7a. In addition, $\theta 1$ and $\theta 2$ are each greater than 0 degrees and smaller than 90 degrees.

That is, $(0°<\theta 1<90°)$, $(0°<\theta 2<90°)$, and $(\theta 1<\theta 2)$ are satisfied.

Figure 3:
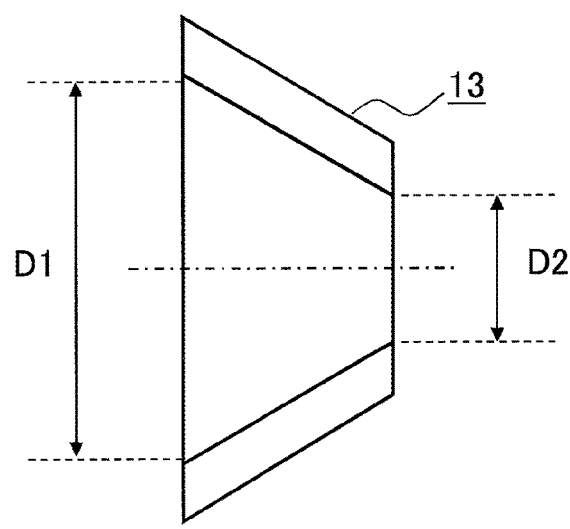
FIG. 3 is a schematic side sectional view of a flexible insulating material used in the electric device according to embodiment 1 of the present invention.

FIG. 3 is a schematic side sectional view of a flexible insulating material used in the electric device according to embodiment 1 of the present invention.

FIG. 3 shows the flexible insulating material 13 that has not yet been disposed in the electric device 100.

As shown in FIG. 3, the flexible insulating material 13 of the present embodiment has a hollow truncated-cone shape in which the inner diameter and the outer diameter on one end side are greater than the inner diameter and the outer diameter on the other end side.

The inner diameter D1 on one end side is equal to the outer diameters of the first solid insulating material 4 and the second solid insulating material 7, and the inner diameter D2 on the other end side is equal to the outer diameters of the first conductor 3 and the second conductor 6.

The flexible insulating material 13 having a hollow truncated-cone shape has the same thickness at every part before the flexible insulating material 13 is inserted in the electric device 100 and the first high-voltage device 1 and the second high-voltage device 2 are connected to each other, and the thickness of the flexible insulating material 13 is greater than a gap between the first opposing surface 4a and the second opposing surface 7a at an end on the outer circumferential side when the first high-voltage device 1 and the second high-voltage device 2 are combined to bring the first conductor contact surface 3a and the second conductor contact surface 6a into contact with each other without inserting the flexible insulating material 13.

As shown in FIG. 1, the first high-voltage device and the second high-voltage device are connected to each other with the flexible insulating material 13 interposed therebetween while the inner circumferential surface of the flexible insulating material 13 contacts with the first opposing surface 4a, the outer circumferential surface of the flexible insulating material 13 contacts with the second opposing surface 7a, and the flexible insulating material 13 is pressurized by the first solid insulating material 4 and the second solid insulating material 7.

As the flexible insulating material 13, for example, silicone rubber is used for such reasons that silicone rubber is elastic and inexpensive and can be easily processed into various shapes.

Figure 4:
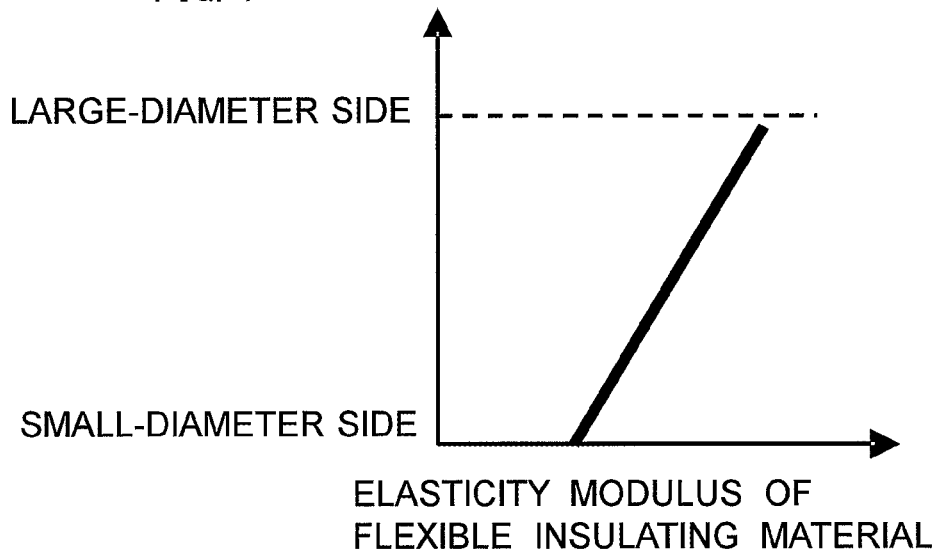
FIG. 4 is a graph showing change, from the small-diameter side to the large-diameter side, in the elasticity modulus of the flexible insulating material according to embodiment 1 of the present invention.

FIG. 4 is a graph showing change, from the small-diameter side to the large-diameter side, in the elasticity modulus of the flexible insulating material according to embodiment 1 of the present invention.

As shown in FIG. 4, the elasticity modulus of the flexible insulating material 13 of the present embodiment gradually increases from the small-diameter side located on the inner circumferential side of each solid insulating material to the large-diameter side located on the outer circumferential side of each solid insulating material when the flexible insulating material 13 is inserted in the electric device 100.

The elasticity modulus of the rubber which is the flexible insulating material is determined by the cross linking density of a giant molecule which is a basic component of the rubber. That is, when the cross linking density is increased, the elasticity modulus increases, and when the cross linking density is decreased, the elasticity modulus decreases.

That is, it is possible to cause the elasticity modulus of the flexible insulating material to have distribution by controlling the cross linking density.

Accordingly, in the present embodiment, the addition amount of a vulcanizing agent is adjusted to control the cross linking density of the flexible insulating material which is rubber. That is, it is possible to obtain the flexible insulating material in which the elasticity modulus increases from the small-diameter side toward the large-diameter side, by gradually increasing the addition amount of the vulcanizing agent from the small-diameter side on which the elasticity modulus is set to be small, toward the large-diameter side on which the elasticity modulus is set to be large.

Next, the procedure for assembling the electric device 100 of the present embodiment by connecting the first high-voltage device 1 and the second high-voltage device 2 will be described.

The flexible insulating material 13 is placed between the first opposing surface 4a of the first high-voltage device 1 and the second opposing surface 7a of the second high-voltage device 2.

Next, at least one of the first high-voltage device 1 and the second high-voltage device 2 is moved in a direction to sandwich the flexible insulating material 13 so that the flexible insulating material 13 is held between the first opposing surface 4a and the second opposing surface 7a.

Next, bolts 11 are inserted into the first bolt fastening portion 9 and the second bolt fastening portion 10, to fasten the first high-voltage device 1 and the second high-voltage device 2 with each other. Thus the electric device 100 in which the flexible insulating material 13 is inserted in a compressed state is formed.

Next, a relationship between partial discharge characteristics and the surface pressure at the contact interface in an electric device in which different insulating materials contact with each other as shown in the present embodiment will be described.

For example, in an electric device composed of two high-voltage devices connected via a flexible insulating material, when high voltage is applied to each central conductor and external ground layers disposed on the outer surface of each solid insulating material with which each central conductor is molded and insulated are grounded, an electric field is applied to each interface between each solid insulating material and the flexible insulating material.

In the electric device having such a structure, these interfaces are parts that are the weakest in insulation characteristics. If bubbles are left at these interfaces and a gap occurs, this becomes a factor for causing partial discharge.

Accordingly, the inventors investigated a relationship between a partial discharge start electric field and a surface pressure (referred to as an interface surface pressure) at the interface between the solid insulating material and the flexible insulating material in the case where pressure is applied to the flexible insulating material via each solid insulating material.

Figure 5:
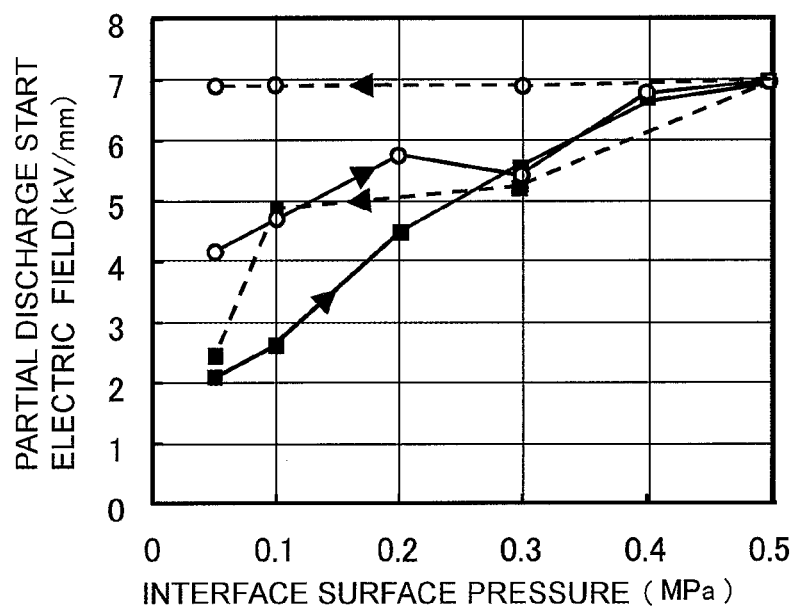
FIG. 5 is a graph showing a relationship between a partial discharge start electric field and an interface surface pressure between each solid insulating material and the flexible insulating material.

FIG. 5 is a graph showing the relationship between the partial discharge start electric field and the interface surface pressure between the solid insulating material and the flexible insulating material. In FIG. 5, a solid line indicates a relationship between the interface surface pressure (MPa) and the partial discharge start electric field (KV/mm) in the case where pressure is applied, and a broken line indicates a relationship between the interface surface pressure (MPa) and the partial discharge start electric field (KV/mm) in the case where the pressure is reduced.

As a result, as shown in FIG. 5, the inventors found a case in which, when pressure is applied to the flexible insulating material to increase the interface surface pressure, the partial discharge start electric field increases (as indicated by a solid line connecting black squares), and when the pressure is reduced to reduce the interface surface pressure, the partial discharge start electric field reduces (as indicated by a broken line connecting black squares). Further the inventors found a case in which, when the interface surface pressure is increased, the partial discharge start electric field increases (as indicated by a solid line connecting white circles), and even when the interface surface pressure is reduced, the partial discharge start electric field does not reduce (as indicated by a broken line connecting white circles).

The phenomenon in which, when the interface surface pressure is increased, the partial discharge start electric field increases, and when the interface surface pressure is reduced, the partial discharge start electric field reduces, is based on a first mechanism in which the partial discharge start electric field increases due to increase in the pressure inside bubbles left at the interface, and the partial discharge start electric field reduces due to reduction in the pressure inside bubbles left at the interface.

The phenomenon in which, when the interface surface pressure is increased, the partial discharge start electric field increases, and even when the interface surface pressure is reduced, the partial discharge start electric field does not reduce, is based on a second mechanism in which bubbles left at the interface are extruded in a process of increasing the interface surface pressure, so that the bubbles themselves decrease.

The inventors found the second mechanism in which the partial discharge start electric field does not reduce even when the interface surface pressure is reduced, thus the inventors led to completion of the invention of the present application.

In the electric device 100 of the present embodiment, the second opposing surface inclination angle θ2 of the second solid insulating material 7 is greater than the first opposing surface inclination angle θ1 of the first solid insulating material 4. Therefore, in a process of connecting the first high-voltage device 1 and the second high-voltage device 2, the opposing surface 4a, 7a of each solid insulating material 4, 7 sequentially comes into contact with the flexible insulating material 13, from the inner circumferential side.

That is, the first high-voltage device 1 and the second high-voltage device 2 are connected while bubbles at the interface between each solid insulating material 4, 7 and the flexible insulating material 13 are extruded to the outer circumferential side. Therefore, in the manufactured electric device 100, there are no bubbles left at each interface.

In the present embodiment, as the flexible insulating material 13, for example, an elastic material such as silicone rubber is used. When the electric device is operated over several tens of years, it is inevitable that the stress is reduced due to aged deterioration and the interface surface pressure at the interface in each solid insulating material reduces.

However, in the electric device 100 of the present embodiment, there are no bubbles left at the interface between each solid insulating material 4, 7 and the flexible insulating material 13 and thus there are no gaps. Therefore, through long-term operation, even when the flexible insulating material 13 is deteriorated over time so that the interface surface pressure is reduced, the insulation performance can be kept excellent.

In the electric device 100 of the present embodiment, when the first high-voltage device 1 and the second high-voltage device 2 are connected, bubbles at the interface between each solid insulating material 4, 7 and the flexible insulating material 13 are extruded. At this time, if, in each interface, the interface surface pressure is biased, i.e., a part in which the interface surface pressure is low exists, bubbles may be left at the part in which the interface surface pressure is low. As a result, there is a risk of reduction in insulation performance when the interface surface pressure reduces due to aged deterioration of the flexible insulating material 13.

As shown in FIG. 2, in the electric device 100 of the present embodiment, since the first opposing surface inclination angle θ1 of the first solid insulating material 4 is smaller than the second opposing surface inclination angle θ2 of the second solid insulating material 7, the distance between the first opposing surface 4a and the second opposing surface 7a is greater on the outer circumferential side than on the inner circumferential side.

Therefore, the compression amount which is the amount of reduction in the thickness of the flexible insulating material 13 gradually decreases from the small-diameter side located on the inner circumferential side toward the large-diameter side located on the outer circumferential side.

That is, since the thickness of the flexible insulating material 13 that has not yet been provided in the electric device 100 is the same at every part, the distortion amount of the flexible insulating material 13 obtained by dividing the compression amount by the thickness gradually decreases from the small-diameter side toward the large-diameter side.

However, in the flexible insulating material 13 of the present embodiment, the elasticity modulus gradually increases from the small-diameter side toward the large-diameter side. Therefore, even though the distortion amount of the flexible insulating material 13 gradually decreases from the small-diameter side toward the large-diameter side, a reaction force occurring due to the compression can be made the same at every part.

Therefore, in the electric device 100 of the present embodiment, the interface surface pressure between each solid insulating material 4, 7 and the flexible insulating material 13 is uniformed at every part and thus is not biased.

In the electric device 100 of the present embodiment, when the first high-voltage device and the second high-voltage device are connected, bubbles are extruded from the interface between each solid insulating material and the flexible insulating material, and the interface surface pressure between each solid insulating material and the flexible insulating material is not biased. Therefore, bubbles are not left.

That is, in the electric device 100 of the present embodiment, insulation performance is not reduced even if the flexible insulating material is deteriorated over time and the interface surface pressure is reduced through long-term operation.

Preferably, a lubricant such as grease is applied to the surface of the flexible insulating material 13 before the first high-voltage device 1 and the second high-voltage device 2 are connected.

This facilitates work for connecting the first high-voltage device 1 and the second high-voltage device 2.

In addition, even if the opposing surface 4a, 7a of each solid insulating material 4, 7 or the surface of the flexible insulating material 13 is rough, the grease fills minute gaps due to the roughness, whereby insulation performance of the electric device can be improved.

In the present embodiment, the first conductor 3 and the second conductor 6 contact with each other via flat surfaces. However, other than flat surfaces, any surfaces that have sufficient contact areas and do not cause gaps may be used.

Although the first conductor 3 protrudes from the first opposing surface 4a, at least one of the first conductor 3 and the second conductor 6 may protrude from the opposing surface of each solid insulating material so that the first conductor 3 and the second conductor 6 can contact with each other.

The means for applying pressure to the flexible insulating material 13 and generating a sufficient interface surface pressure is obtained by fastening of bolts. However, the interface surface pressure may be generated by using elasticity of a spring, for example.

Embodiment 2

Figure 6:
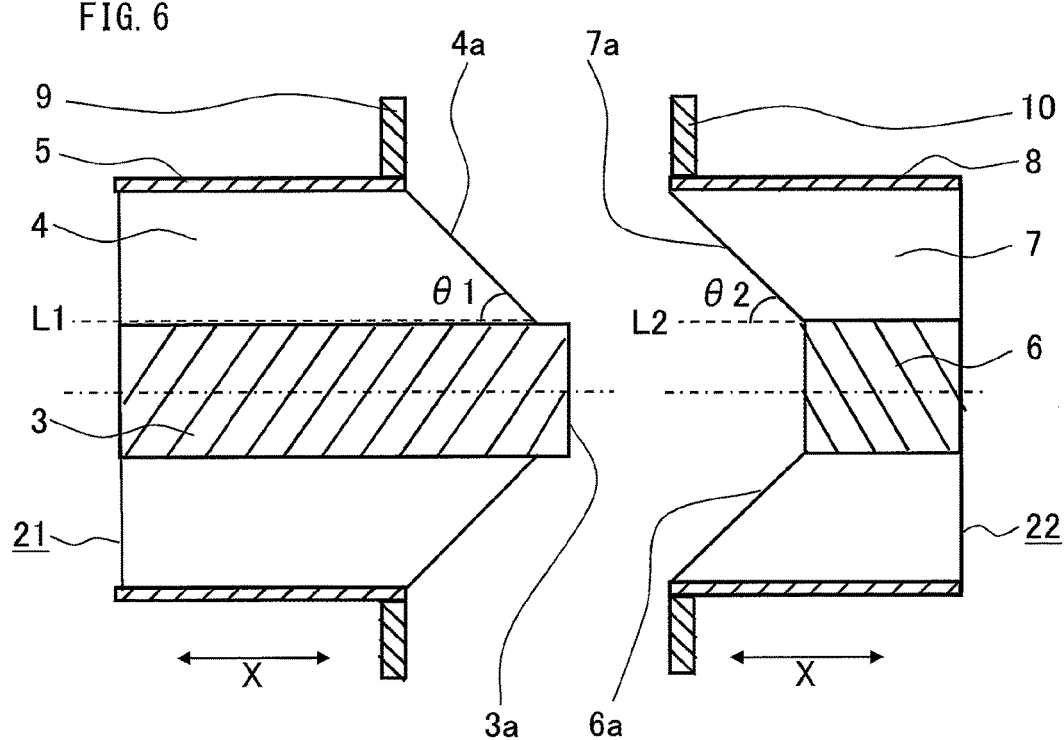
FIG. 6 is a schematic side sectional view of high-voltage devices used in an electric device according to embodiment 2 of the present invention.

FIG. 6 is a schematic side sectional view of high-voltage devices used in an electric device according to embodiment 2 of the present invention.

Figure 7:
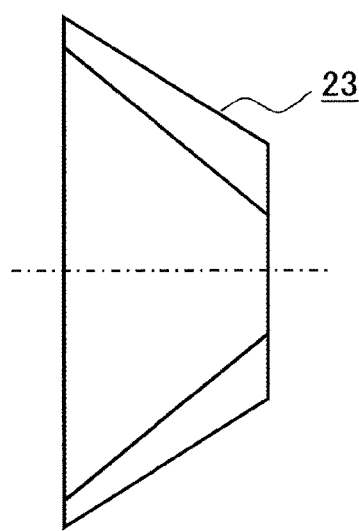
FIG. 7 is a schematic side sectional view of a flexible insulating material used in the electric device according to embodiment 2 of the present invention.

FIG. 7 is a schematic side sectional view of a flexible insulating material used in the electric device according to embodiment 2 of the present invention.

As shown in FIG. 6, members composing the first high-voltage device 21 and the second high-voltage device 22 in the present embodiment are the same as those of the first high-voltage device 1 and the second high-voltage device 2 in embodiment 1, but the first opposing surface inclination angle θ1 of the first solid insulating material 4 is equal to the second opposing surface inclination angle θ2 of the second solid insulating material 7.

FIG. 7 shows the flexible insulating material 23 that has not yet been inserted in the electric device.

As shown in FIG. 7, the flexible insulating material 23 of the present embodiment is the same as the flexible insulating material 13 of embodiment 1 except that the thickness of the flexible insulating material 23 gradually increases from the large-diameter side located on the outer circumferential side of each solid insulating material toward the small-diameter side located on the inner circumferential side of each solid insulating material when the flexible insulating material 23 is inserted in the electric device.

The thickness at the large-diameter-side end which is the thinnest is greater than a gap between the first opposing surface 4a and the second opposing surface 7a in the case where the first high-voltage device 21 and the second high-voltage device 22 are combined to bring the first conductor contact surface 3a and the second conductor contact surface 6a into contact with each other without inserting the flexible insulating material 23.

The elasticity modulus of the flexible insulating material 23 gradually decreases from the large-diameter side toward the small-diameter side.

In the electric device of the present embodiment, the thickness of the small-diameter side of the flexible insulating material 23 that has not yet been inserted in the electric device is greater than the thickness of the large-diameter side of the flexible insulating material 23. Therefore, in a process of connecting the first high-voltage device 21 and the second high-voltage device 22, the opposing surface 4a, 7a of each solid insulating material 4, 7 sequentially comes into contact with the flexible insulating material 23, from the inner circumferential side.

That is, the first high-voltage device 21 and the second high-voltage device 22 are connected while bubbles at the interface between each solid insulating material 4, 7 and the flexible insulating material 23 are extruded to the outer circumferential side. Therefore, in the manufactured electric device, no bubbles are left at each interface.

In the electric device of the present embodiment, the first opposing surface inclination angle θ1 of the first solid insulating material 4 is equal to the second opposing surface inclination angle θ2 of the second solid insulating material 4, and the thickness of the flexible insulating material 23 that has not yet been inserted in the electric device gradually increases from the large-diameter side toward the small-diameter side. Therefore, the distortion amount due to the compression gradually increases from the large-diameter side toward the small-diameter side.

However, since the elasticity modulus gradually decreases from the large-diameter side toward the small-diameter side, a reaction force occurring due to compression of the flexible insulating material 23 can be made the same at every part.

Therefore, in the electric device of the present embodiment, the interface surface pressure between each solid insulating material 4, 7 and the flexible insulating material 23 is uniformed at every part and thus is not biased.

That is, in the electric device of the present embodiment, since there are no bubbles at the interface between each solid insulating material and the flexible insulating material and the interface surface pressure is not biased, insulation performance can be kept stable over a long period without deterioration in partial discharge characteristics even if the flexible insulating material is deteriorated over time and the interface surface pressure reduces through long-term operation.

Embodiment 3

Figure 8:
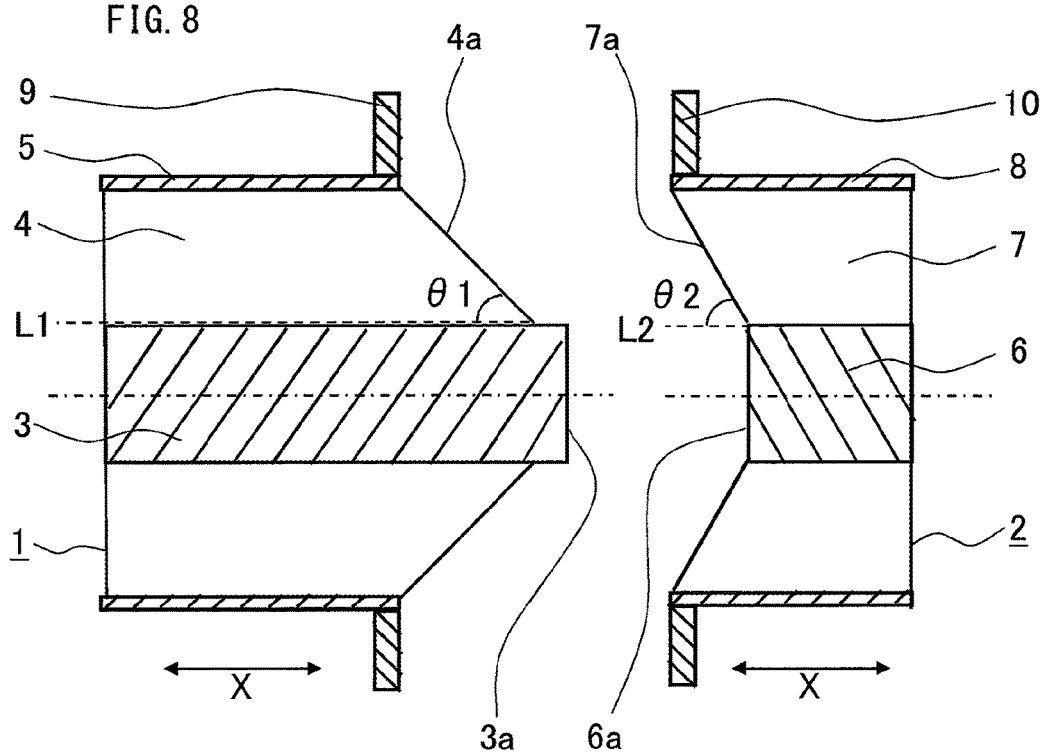
FIG. 8 is a schematic side sectional view of high-voltage devices used in an electric device according to embodiment 3 of the present invention.

FIG. 8 is a schematic side sectional view of high-voltage devices used in an electric device according to embodiment 3 of the present invention.

Figure 9:
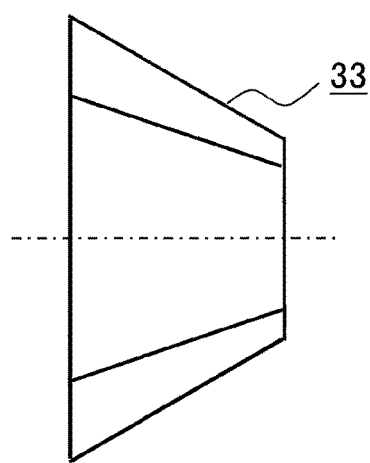
FIG. 9 is a schematic side sectional view of a flexible insulating material used in the electric device according to embodiment 3 of the present invention.

FIG. 9 is a schematic side sectional view of a flexible insulating material used in the electric device according to embodiment 3 of the present invention.

The electric device of the present embodiment is the same as the electric device 100 of embodiment 1 except for difference in the thickness and the elasticity modulus of the flexible insulating material.

As shown in FIG. 8, the first high-voltage device, the second high-voltage device, and the means for fastening the first high-voltage device and the second high-voltage device in the present embodiment are the same as those in embodiment 1, and the reference characters of components shown in FIG. 8 are the same as those in embodiment 1.

FIG. 9 shows a flexible insulating material 33 that has not yet been inserted in the electric device.

As shown in FIG. 9, the thickness of the flexible insulating material 33 of the present embodiment gradually increases from the small-diameter side located on the inner circumferential side of each solid insulating material toward the large-diameter side located on the outer circumferential side of each solid insulating material when the flexible insulating material 33 is inserted in the electric device.

The thickness of the flexible insulating material 33 at every part is greater than a gap between the first opposing surface 4a and the second opposing surface 7a located at positions in the case where the first high-voltage device 1 and the second high-voltage device 2 are combined to bring the first conductor contact surface 3a and the second conductor contact surface 6a into contact with each other without inserting the flexible insulating material 33. The elasticity modulus of the flexible insulating material 33 is the same at every part.

In the electric device of the present embodiment, the first opposing surface inclination angle θ2 of the second solid insulating material 7 is greater than the first opposing surface inclination angle θ1 of the first solid insulating material 4. Therefore, in a process of connecting the first high-voltage device 1 and the second high-voltage device 2, the opposing surface 4a, 7a of each solid insulating material 4, 7 sequentially comes into contact with the flexible insulating material 33, from the inner circumferential side.

That is, the first high-voltage device 1 and the second high-voltage device 2 are connected while bubbles at the interface between each solid insulating material 4, 7 and the flexible insulating material 33 are extruded to the outer circumferential side. Therefore, in the manufactured electric device, no bubbles are left at each interface.

In the present embodiment, the first high-voltage device 1 and the second high-voltage device 2 are the same as those in embodiment 1, and therefore, when they are connected to form an electric device, the distance between the first opposing surface 4a and the second opposing surface 7a is greater on the outer circumferential side than on the inner circumferential side.

However, since the thickness of the flexible insulating material 33 that has not yet been disposed in the electric device gradually increases from the small-diameter side toward the large-diameter side, the compression amount on the large-diameter side becomes great and thus the distortion amount of the flexible insulating material 33 can be made the same at every part.

Also, since the elasticity modulus of the flexible insulating material 33 is the same at every part, a reaction force due to compression occurring in the flexible insulating material 33 can be made the same at every part.

Therefore, in the electric device of the present embodiment, the interface surface pressure between each solid insulating material 4, 7 and the flexible insulating material 33 is uniformed at every part and thus is not biased.

That is, in the electric device of the present embodiment, since there are no bubbles at the interface between each solid insulating material and the flexible insulating material and the interface surface pressure is not biased, insulation performance can be kept stable over a long period without deterioration in partial discharge characteristics even if the flexible insulating material is deteriorated over time and the interface surface pressure reduces through long-term operation.

In general, the flexible insulating material of silicone rubber is manufactured as follows: a mold having a cavity having the same shape as the flexible insulating material is prepared, a fluid raw material to which a vulcanizing agent is added is injected into the cavity, and then the fluid raw material is heated to be hardened.

The elasticity modulus of the flexible insulating materials of embodiments 1 and 2 differs among the respective parts. Such a flexible insulating material having an elasticity modulus that differs among the respective parts is formed by using a raw material in which the concentration of added vulcanizing agent is changed among the respective parts, and thus the manufacturing thereof is not easy.

On the other hand, the flexible insulating material of the present embodiment has the same elasticity modulus at every part and is molded by using a raw material in which the concentration of the vulcanizing agent is uniformed. Therefore, the manufacturing thereof is easy, the manufacturing yield is high, and the cost of the electric device can be reduced.

Embodiment 4

Figure 10:
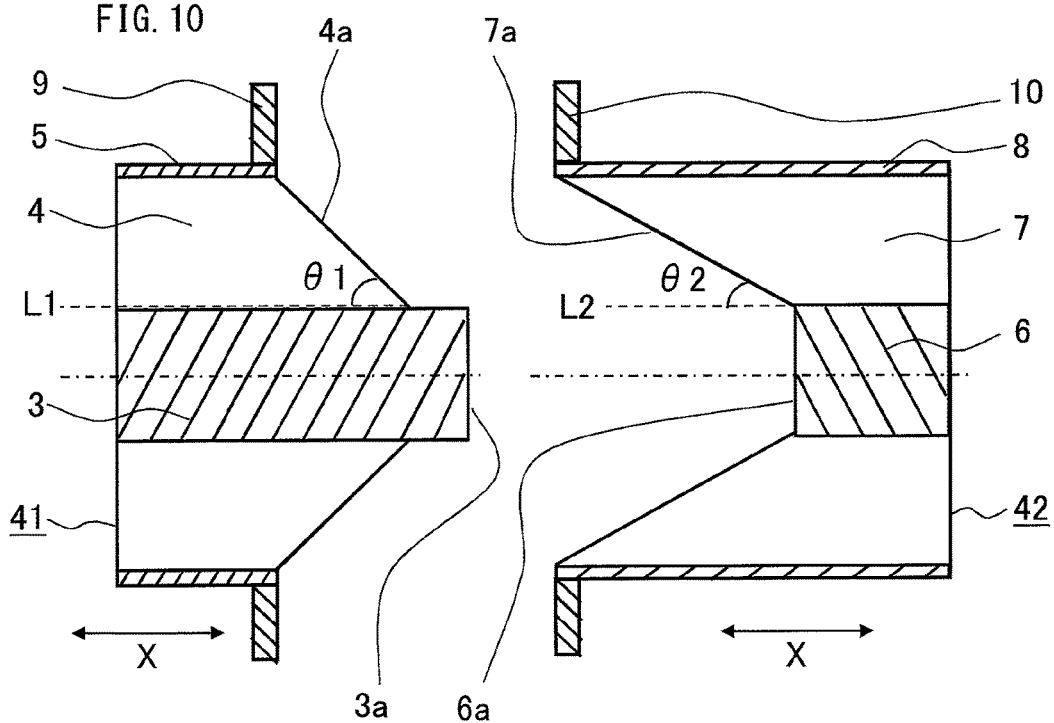
FIG. 10 is a schematic side sectional view of high-voltage devices used in an electric device according to embodiment 4 of the present invention.

FIG. 10 is a schematic side sectional view of high-voltage devices used in an electric device according to embodiment 4 of the present invention.

Figure 11:
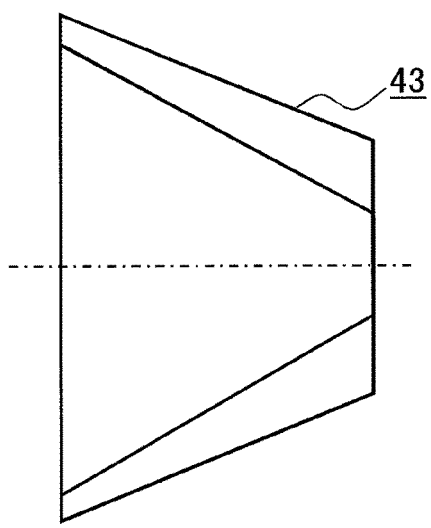
FIG. 11 is a schematic side sectional view of a flexible insulating material used in the electric device according to embodiment 4 of the present invention.

FIG. 11 is a schematic side sectional view of a flexible insulating material used in the electric device according to embodiment 4 of the present invention.

As shown in FIG. 10, the first high-voltage device 41 and the second high-voltage device 42 of the present embodiment are the same as the first high-voltage device 1 and the second high-voltage device 2 of embodiment 1 except that the first opposing surface inclination angle θ1 of the first solid insulating material 4 is greater than the second opposing surface inclination angle θ2 of the second solid insulating material 7.

FIG. 11 shows the flexible insulating material 43 that has not yet been inserted in the electric device.

As shown in FIG. 11, the outer shape of the flexible insulating material 43 of the present embodiment is the same as the outer shape of the flexible insulating material 23 of embodiment 2, and the thickness of the flexible insulating material 43 gradually increases from the large-diameter side located on the outer circumferential side of each solid insulating material toward the small-diameter side located on the inner circumferential side of each solid insulating material when the flexible insulating material 43 is inserted in the electric device.

The thickness of the flexible insulating material 43 at every part is greater than a gap between the first opposing surface 4a and the second opposing surface 7a in the case where the first high-voltage device 41 and the second high-voltage device 42 are combined to bring the first conductor contact surface 3a and the second conductor contact surface 6a into contact with each other without inserting the flexible insulating material 43.

In addition, the elasticity modulus of the flexible insulating material 43 is the same at every part.

In the electric device of the present embodiment, the thickness of the small-diameter side of the flexible insulating material 43 that has not yet been inserted in the electric device is greater than the thickness of the large-diameter side of the flexible insulating material 43. Therefore, in a process of connecting the first high-voltage device 41 and the second high-voltage device 42, the opposing surface 4a, 7a of each solid insulating material 4, 7 sequentially comes into contact with the flexible insulating material 43, from the inner circumferential side.

That is, the first high-voltage device 41 and the second high-voltage device 42 are connected while bubbles at the interface between each solid insulating material 4, 7 and the flexible insulating material 43 are extruded to the outer circumferential side. Therefore, in the manufactured electric device, no bubbles are left at each interface.

As shown in FIG. 10, the first opposing surface inclination angle θ1 of the first high-voltage device 41 is greater than the second opposing surface inclination angle θ2 of the second high-voltage device 42, and therefore, in the electric device of the present embodiment, the distance between the first opposing surface 4a and the second opposing surface 7a is greater on the inner circumferential side than on the outer circumferential side.

However, the thickness of the flexible insulating material 43 increases from the large-diameter side located on the outer circumferential side of each solid insulating material toward the small-diameter side located on the inner circumferential side of each solid insulating material when the flexible insulating material 43 is inserted in the electric device. Therefore, the distortion amount can be made the same at every part.

Further, since the elasticity modulus of the flexible insulating material 43 is the same at every part, a reaction force due to compression occurring in the flexible insulating material 43 can be made the same at every part.

Therefore, in the electric device of the present embodiment, the interface surface pressure between each solid insulating material 4, 7 and the flexible insulating material 43 is uniformed at every part and thus is not biased.

That is, in the electric device of the present embodiment, since there are no bubbles at the interface between each solid insulating material and the flexible insulating material and the interface surface pressure is not biased, insulation performance can be kept stable over a long period without deterioration in partial discharge characteristics even if the flexible insulating material is deteriorated over time and the interface surface pressure reduces through long-term operation.

In addition, the flexible insulating material of the present embodiment has the same elasticity modulus at every part and is molded by using a raw material in which the concentration of the vulcanizing agent is uniformed. Therefore, the manufacturing thereof is easy, the manufacturing yield is high, and the cost of the electric device can be reduced.

It is noted that, within the scope of the present invention, the above embodiments may be freely combined with each other, or each of the above embodiments may be modified or eliminated appropriately.

INDUSTRIAL APPLICABILITY

In the electric device of the present invention, insulation performance is not reduced even after long-term operation. Therefore, the electric device of the present invention is applicable to an electric device that configures a system required to have a long life.

The invention claimed is:

1. An electric device comprising a first high-voltage device and a second high-voltage device that are connected to each other via a flexible insulating material, wherein
   the first high-voltage device includes a first conductor provided at a center thereof, and a first solid insulating material provided around an outer circumference of the first conductor and insulating the first conductor,
   the second high-voltage device includes a second conductor provided at a center thereof, and a second solid insulating material provided around an outer circumference of the second conductor and insulating the second conductor,
   the first conductor and the second conductor are electrically conductive to each other,
   the first solid insulating material has a shape having a side wall surface of a truncated cone such that a first opposing surface thereof which is a surface opposed to the second solid insulating material protrudes in an axial direction,
   the second solid insulating material has a shape having a side wall surface of a truncated cone such that a second opposing surface thereof which is a surface opposed to the first solid insulating material is dented in the axial direction,
   a first opposing surface inclination angle which is an interior angle formed by the first opposing surface and a virtual line that is parallel with the axial direction and extends toward a counter-protrusion side from the first opposing surface, is smaller than a second opposing surface inclination angle which is an interior angle formed by the second opposing surface and a virtual line that is parallel with the axial direction and extends toward a counter-dented side from the second opposing surface,
   the flexible insulating material has a hollow truncated-cone shape such that an inner diameter and an outer diameter thereof at an end on one side are respectively greater than those at an end on another side, the flexible insulating material having an inner circumferential side surface in contact with the first opposing surface and having an outer circumferential side surface in contact with the second opposing surface,
   when a thickness of the flexible insulating material that has not yet been inserted between the first high-voltage device and the second high-voltage device is the same at every part, an elasticity modulus of the flexible insulating material gradually increases from a small-diameter side toward a large-diameter side, and
   when the thickness of the flexible insulating material that has not yet been inserted between the first high-voltage device and the second high-voltage device gradually increases from the small-diameter side toward the large-diameter side, the elasticity modulus of the flexible insulating material is the same at every part.

2. An electric device comprising a first high-voltage device and a second high-voltage device that are connected to each other via a flexible insulating material, wherein
the first high-voltage device includes a first conductor provided at a center thereof, and a first solid insulating material provided around an outer circumference of the first conductor and insulating the first conductor,
the second high-voltage device includes a second conductor provided at a center thereof, and a second solid insulating material provided around an outer circumference of the second conductor and insulating the second conductor,
the first conductor and the second conductor are electrically conductive to each other,
the first solid insulating material has a shape having a side wall surface of a truncated cone such that a first opposing surface thereof which is a surface opposed to the second solid insulating material protrudes in an axial direction,
the second solid insulating material has a shape having a side wall surface of a truncated cone such that a second opposing surface thereof which is a surface opposed to the first solid insulating material is dented in the axial direction,
the flexible insulating material has a hollow truncated-cone shape such that an inner diameter and an outer diameter thereof at an end on one side are respectively greater than those at an end on another side, the flexible insulating material having an inner circumferential side surface in contact with the first opposing surface and having an outer circumferential side surface in contact with the second opposing surface,
when a first opposing surface inclination angle which is an interior angle formed by the first opposing surface and a virtual line that is parallel with the axial direction and extends toward a counter-protrusion side from the first opposing surface, is equal to a second opposing surface inclination angle which is an interior angle formed by the second opposing surface and a virtual line that is parallel with the axial direction and extends toward a counter-dented side from the second opposing surface, a thickness of the flexible insulating material that has not yet been inserted between the first high-voltage device and the second high-voltage device gradually increases from a large-diameter side toward a small-diameter side, and an elasticity modulus of the flexible insulating material gradually decreases from the large-diameter side toward the small-diameter side, and
when the first opposing surface inclination angle is greater than the second opposing surface inclination angle, the thickness of the flexible insulating material that has not yet been inserted between the first high-voltage device and the second high-voltage device gradually increases from the large-diameter side toward the small-diameter side, and the elasticity modulus of the flexible insulating material is the same at every part.

3. A method for manufacturing an electric device, comprising:
providing a first high-voltage device and a second high-voltage device to be connected to each other via a flexible insulating material, the first high-voltage device including a first conductor provided at a center thereof and a first solid insulating material provided around the outer circumference of the first conductor and insulating the first conductor, the second high-voltage device including a second conductor provided at a center thereof and a second solid insulating material provided around an outer circumference of the second conductor and insulating the second conductor,
providing the first solid insulating material with a shape having a side wall surface of a truncated cone such that a first opposing surface thereof which is a surface opposed to the second solid insulating material protrudes in an axial direction,
providing the second solid insulating material with a shape having a side wall surface of a truncated cone such that a second opposing surface thereof which is a surface opposed to the first solid insulating material is dented in the axial direction,
providing a first opposing surface inclination angle which is an interior angle formed by the first opposing surface and a virtual line that is parallel with the axial direction and extends toward a counter-protrusion side from the first opposing surface, to be smaller than a second opposing surface inclination angle which is an interior angle formed by the second opposing surface and a virtual line that is parallel with the axial direction and extends toward a counter-dented side from the second opposing surface,
providing the flexible insulating material with a hollow truncated-cone shape in which an inner diameter and an outer diameter thereof at an end on one side are respectively greater than those at an end on another side,
designing the flexible insulating material such that a thickness thereof is the same at every part and an elasticity modulus thereof gradually increases from a small-diameter side toward a large-diameter side, or such that the thickness thereof gradually increases from the small-diameter side toward the large-diameter side and the elasticity modulus thereof is the same at every part, and
connecting the first high-voltage device and the second high-voltage device to each other such that an inner circumferential side surface of the flexible insulating material is in contact with the first opposing surface and an outer circumferential side surface of the flexible insulating material is in contact with the second opposing surface.

* * * * *